(12) United States Patent
Monereau

(10) Patent No.: US 6,315,818 B1
(45) Date of Patent: Nov. 13, 2001

(54) PROCESS FOR THE PURIFICATION OF A GAS BY ADSORPTION

(75) Inventor: Christian Monereau, Paris (FR)

(73) Assignee: L'Air Liquide, Societe Anonyme pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/482,890

(22) Filed: Jan. 14, 2000

(30) Foreign Application Priority Data

Jan. 29, 1999 (FR) .................................................. 99 01035

(51) Int. Cl.[7] .................................................. B01D 53/053
(52) U.S. Cl. ..................................... 95/98; 95/23; 95/105
(58) Field of Search ................................. 95/12, 22, 23, 95/96–106

(56) References Cited

U.S. PATENT DOCUMENTS

| | | | | |
|---|---|---|---|---|
| 3,703,068 | * | 11/1972 | Wagner | 95/98 X |
| 4,160,651 | * | 7/1979 | Pivard | 95/97 |
| 4,323,370 | * | 4/1982 | Leitgeb | 95/103 X |
| 4,693,730 | * | 9/1987 | Miller et al. | 95/12 X |
| 4,705,541 | * | 11/1987 | Sircar | 95/98 |
| 4,761,165 | * | 8/1988 | Stocker et al. | 95/98 X |
| 4,775,394 | * | 10/1988 | Yamano et al. | 95/101 |
| 4,915,711 | * | 4/1990 | Kumar | 95/101 |
| 5,232,473 | * | 8/1993 | Kapoor et al. | 95/101 |
| 5,248,322 | * | 9/1993 | Kumar | 95/101 |
| 5,254,154 | * | 10/1993 | Gauthier et al. | 95/100 X |
| 5,354,346 | * | 10/1994 | Kumar | 95/101 |
| 5,529,607 | * | 6/1996 | Tan | 95/100 X |
| 5,536,300 | * | 7/1996 | Reinhold, III et al. | 95/101 |
| 5,542,966 | * | 8/1996 | D'Amico et al. | 95/101 |
| 5,964,924 | * | 10/1999 | Engler et al. | 95/98 |

FOREIGN PATENT DOCUMENTS 0 538 140   4/1993  (EP) .
0 890 387   1/1999  (EP) .

* cited by examiner

Primary Examiner—Robert H. Spitzer
(74) Attorney, Agent, or Firm—Young & Thompson

(57) ABSTRACT

A pressure swing adsorption cycle in which a regeneration phase is terminated by at least one final step in which a residual gas is withdrawn counter-current to the adsorber (1 to 3). A variable portion of the residual gas is recycled, representing from 0 to 30% of the flow of the purified gas product, into the impure gas to be treated, the rest of this residual gas constituting a purge. The duration of the cycle is reduced when this recycling is carried out, the more so as the recycle flow rate is the greater. The cycle has particular application in the production of hydrogen, helium or neon.

10 Claims, 2 Drawing Sheets

PROCESS FOR THE PURIFICATION OF A GAS BY ADSORPTION

FIELD OF THE INVENTION

The present invention relates to a process for the purification of a gas containing preferentially adsorbable impurities, particularly hydrogen, by pressure swing adsorption (PSA), of the type using several adsorbers with, for each adsorber, a cycle comprising the following operative phases, which are offset from one adsorber to another with an nth duration of the duration of the cycle, in which n designates the number of adsorbers: substantially isobaric adsorption at a high pressure of the cycle, this adsorption phase comprising the admission of impure gas to be treated into the adsorber at a first end, so-called entry end, of the adsorber, with circulation of this gas through the adsorber and simultaneous withdrawal from the other end of the adsorber of purified gas of which at least a portion constitutes the gas product, the direction of circulation in the adsorber in the course of this producing phase being called co-current and the reverse direction of circulation being called counter-current; regeneration of the adsorber ending in at least one final step in which a residual gas is withdrawn counter-current from the adsorber; and increase in pressure to the high pressure of the cycle.

The invention is applicable in particular to the production of gases available in limited quantities such as hydrogen, helium and neon, the production of hydrogen being the most important application.

BACKGROUND OF THE INVENTION

For the production of such gases, the extraction output is generally the preponderant parameter. To maximize performance, the durations of the different steps are chosen to be sufficiently long that the adsorbents operate at equilibrium, which is to say in which there is no kinetic limitation. The duration of adsorption for an adsorber is thus typically of the order of 2 to 4 minutes for total cycle durations generally greater than 10 minutes.

So as to increase the output, numerous PSA adsorption cycles comprising, in the course of the regeneration phase, several successive pressure balancings, have been proposed.

However, this latter technique is costly of capital, because it requires installing a large number of adsorbers each having an increased size. Moreover, this increased investment is particularly penalizing when the maximum demand for the production gas is only temporary.

SUMMARY OF THE INVENTION

The invention has for its object to permit achieving in a particularly economical fashion, high extraction outputs, not only for impure gases already very rich (which is to say, in the case of hydrogen, containing typically at least 90%, and generally at least 98 to 99%, of hydrogen) but also for impure gases substantially purer, containing typically, in the case of hydrogen, up to about 30% of impurities.

To this end, the invention has for its object a process of the mentioned type, characterized in that:
  a variable portion of said residual gas is recycled, representing from 0 to 30% of the purified gas product flow rate, into the impure gas to be treated, the rest of this residual gas constituting a purge; and
  the duration of the cycle is decreased when said recycling is carried out, the more so as the recycled flow rate is the greater.

The process according to the invention can comprise one or several of the following characteristics, taken alone or in any possible technical combinations:
  the flow rate of recycled residual gas is temporarily zero and temporarily comprised between 10 and 30% of the flow rate of the purified gaseous product;
  residual gas is recycled when and only when the flow rate of the gaseous product is greater than a predetermined value;
  the flow rate of impure feed gas is maintained constant, and the flow rate of the recycled residual gas is varied as a function of the flow rate of the purified gaseous product, the variations of these flow rates taking place in the same sense;
  the decrease of the cycle duration is comprised between about 1 and 30% of the duration of the cycle without recycling;
  said regeneration begins with a single co-current PSI depressurization with another adsorber in pressure increase phase;
  the regeneration comprises two so-called final steps, namely
    (a) a countercurrent depressurization to a low pressure of the cycle; and
    (b) a countercurrent elution;
  said single step of co-current depressurization by PSA is followed with a second co-current depressurization, the gas from the adsorber during this step being used as elution gas;
  an adsorption unit is used with three adsorbers, and the gas from the adsorber in the course of the second co-current depressurization step is sent to an auxiliary elution storage; and
  an adsorption unit with four adsorbers is used, and the gas from the adsorber in the course of the second co-current depressurization step is directly sent to another adsorber to carry out its counter-current elution.

BRIEF DESCRIPTION OF THE DRAWINGS

Examples of the practice of the invention will now be described with respect to the accompanying drawings, in which.

DETAILED DESCRIPTION OF THE INVENTION

Figure 1:
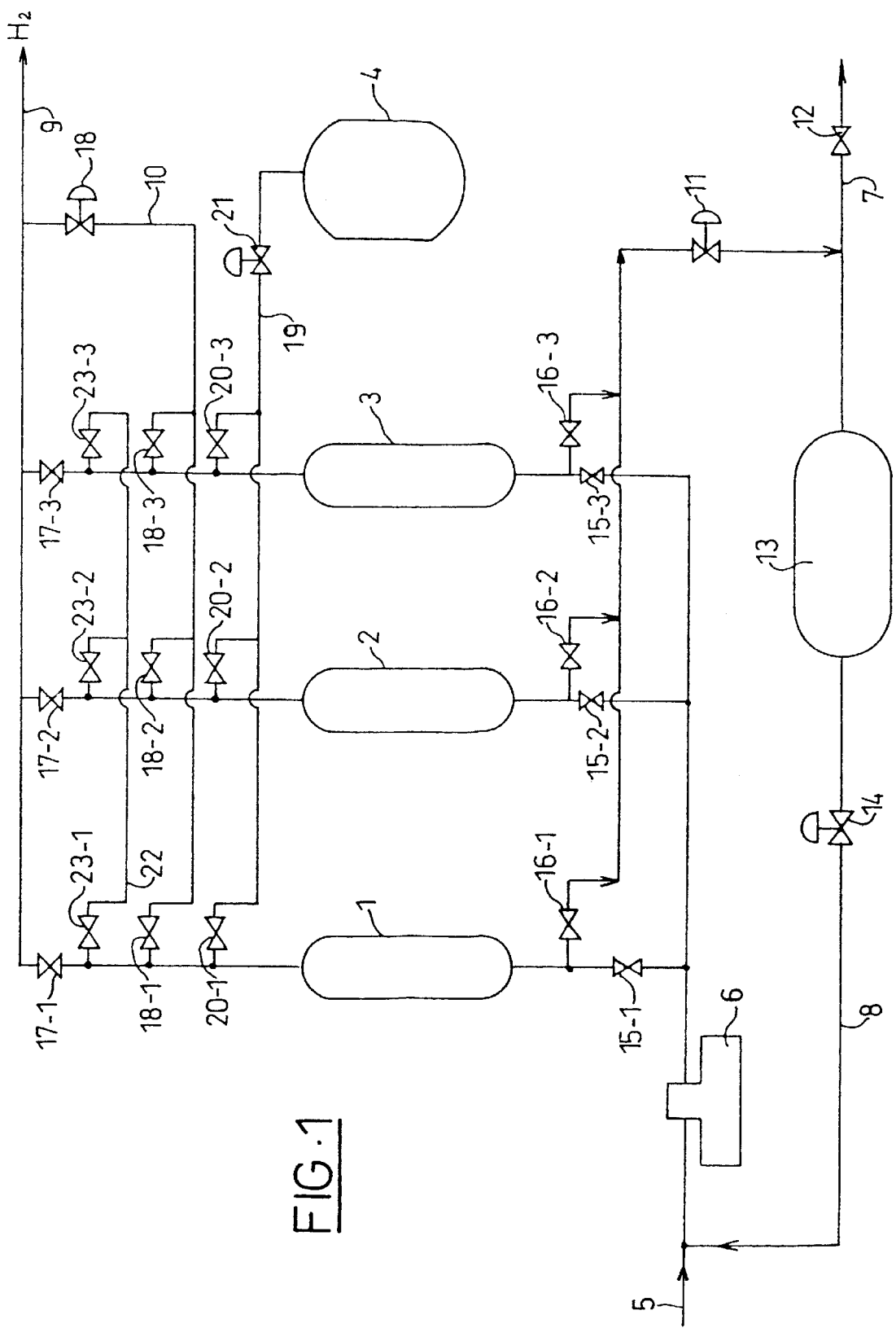
FIG. 1 shows schematically an installation for the purification of hydrogen according to the invention.

The installation shown in FIG. 1 is adapted to produce practically pure hydrogen from an inlet mixture of "feed" constituted by impure hydrogen. This feed gas can be already rich in hydrogen, which is to say containing typically at least about 90%, and generally at least 98 to 99% of hydrogen. It can also be substantially poorer, which is to say containing typically 70 to 90% $H_2$.

The installation comprises three adsorbers 1 to 3, an auxiliary storage 4, an inlet line 5 provided with a compressor 6, a purge line 7, a recycling line 8 taken from this line 7 and connected to the inlet line 5 upstream of the compressor, a purified hydrogen production line 9, and a purified hydrogen withdrawal line 10 from the line 9.

The purge line 7 comprises, respectively from upstream to downstream of the connection with line 8, a member 11 for adjusting the flow rate and a purge valve 12. The line 8 is provided, from the line 7, with a storage capacity 13, then a flow rate adjustment member 14.

The line 5 is connected to the inlet of each adsorber by means of respective valve 15-1, 15-2, 15-3. Similarly, the line 7 is connected to the inlet of each adsorber by means of a respective valve 16-1, 16-2, 16-3.

The line 9 is connected to the outlet of each adsorber by means of a respective valve 17-1, 17-2, 17-3. Similarly, the line 10, provided adjacent its connection with the line 9 with a flow regulating member 18, is connected to the outlet of each adsorber by means of respective valve 18-1, 18-2, 18-3.

The storage 4 can be connected to the outlet of each adsorber by a conduit 19 provided with three valves 20-1, 20-2 and 20-3, respectively, and a flow rate adjustment member 21 located adjacent the inlet of the storage.

Moreover, the balancing line 22 provided with respect to valves 23-1, 23-2 and 23-3 permits connecting the outlets of the three adsorbers two by two.

Figure 2:
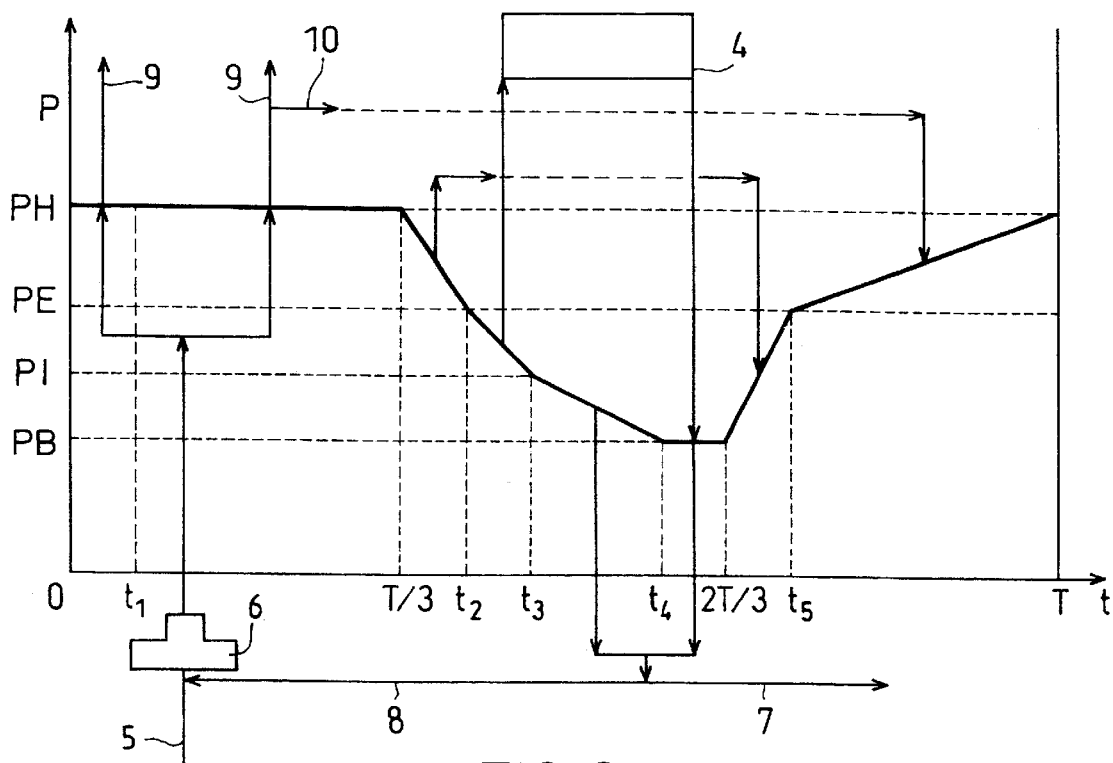
FIG. 2 is a diagram showing the cycle of operation of this installation.

By means of this installation, which comprises known control means and regulation means (not shown), there is provided for each adsorber a cycle which has been shown in FIG. 2 with reference to the adsorber 1. If T designates the duration of the cycle, the operation of the adsorber 2 takes place offset in time by T/3 and that of adsorber 3 offset in time by 2T/3.

In FIG. 2, in which the time $t$ is shown on the abscissa and the absolute pressure P on the ordinate, the lines marked with arrows indicate the movements and destinations of the gaseous flows; when the arrows are parallel to the axis of the ordinates, they indicate, moreover, the direction of circulation in an adsorber; when an arrow is in the direction of the increasing ordinates (upwardly in the diagram), the flow is called co-current, in the adsorber; if the upwardly-directed arrow is located below the line indicating pressure in the adsorber, the current enters the adsorber by the inlet end of the adsorber; if the upwardly-directed arrow is located above the line indicating pressure, the current leaves the adsorber by the outlet end of the adsorber, the inlet and outlet ends being respectively those of the gas to be treated and the gas withdrawn in the isobaric production phase; when an arrow is directed toward decreasing ordinates (downwardly in the diagram), the current is called counter-current, in the adsorber. If the downwardly-directed arrow is located below the line indicating the pressure in the adsorber, the current leaves the adsorber by the inlet end of the adsorber; if the downwardly-directed arrow is located above the line indicating pressure, the current enters the adsorber by the outlet end of the adsorber, the inlet and outlet ends being again those of the gas to be treated and of the gas withdrawn in the isobaric production phase. On the other hand, there is indicated in full lines the gaseous currents which relate exclusively to the adsorber 1 and in broken lines the gaseous currents from or in the direction of the other adsorbers.

Thus, for the adsorber 1, the cycle comprises the following phases:

(a) From t=0 to T/3, impure hydrogen to be treated arriving via the line 5 and compressed by the compressor 6, is introduced under high pressure PH of the cycle at the inlet of the adsorber, and an isobaric current of pure hydrogen is withdrawn under the same pressure from the outlet of the adsorber.

From t=0 to t=1, all the gas from the adsorber is evacuated via the conduit 9 as product gas. From t1 to T/3, on the contrary, only a portion of this current, evacuated via the line 9, constitutes the production of the installation, and the rest is sent to another adsorber in the course of the final repressurization step described later.

(b) from T/3 to 2T/3, the adsorber is regenerated by means of the following steps:

From T/3 to t2<2T/3, the outlet of the adsorber is connected to that of another adsorber at the beginning of the pressure increase phase. This step of first co-current depressurization takes place until the pressures of the two adsorbers are equal to an equilibrium pressure PE.

From t2 to t3<2T/3, of the gas withdrawn from the outlet of the adsorber is sent to the auxiliary storage 4, which continues until the depressurization of the adsorber to an intermediate pressure PI.

From t3 to t4<2T/3, the adsorber is decompressed countercurrent, by supplying residual gas in the line 7. This step takes place until the low pressure of the cycle PB.

From t4 to 2T/3, the adsorber is purged counter-current by elution by means of gas from the auxiliary storage 4, which again produces residual gas sent to the purge line 7.

In the course of the two final steps of regeneration described above, which produce a countercurrent residual gas, a portion of the residual gas is recycled via the line 8 and sent to the intake of the compressor 6. The rest of the residual gas is evacuated from the installation, as purge, via the line 7 and the valve 12.

(c) From 2T/3 to T, the adsorber is repressurized by the following steps:

From 2T/3 to t5<T, the pressure in the adsorber rises from PB to PE by pressure balancing with another adsorber in the course of the first co-current depressurization, described above.

From t5 to T, the final step of return to the high pressure PH by withdrawal of a portion of the hydrogen product via the line 10.

The flow rate of recycled residual gas and the parameters of the process are determined in the following manner. The flow rate of the impure gas to be treated (feed) is taken to be constant.

The following characteristics relative to recycling are general and are not limited to the cycle described above by way of example.

(1) The adsorbers have an optimum volume for the flow rate of feed without recycling of the residual gas.

This situation is present particularly when the installation has been initially produced without a recycling device and the latter has been added afterward to increase the production of hydrogen.

(2) When the demand for hydrogen exceeds the nominal flow rate obtained by treating all the available feed, a flow rate of residual gas at most equal to 30% of the flow rate of hydrogen product is recycled.

(3) When a residual flow rate is recycled, to maintain the purity of the hydrogen product, the duration T of the cycle is reduced, the more so as the recycled flow rate is greater.

Under these conditions, the treated flow rate (feed+recycled gas) increases, as well correspondingly as the speeds of flow of gases in the installation. However, these increases, to a value of the recycled flow rate of the order of 30% of the flow rate of the gaseous product, remains sufficiently moderate so as not to have any drawback from the point of view of mechanical strength and operation of the installation.

The kinetics of adsorption are less favorable because of the shortening of the steps, but the corresponding loss of output is more than compensated by the increase of the flow rate of treated hydrogen, as shown by the following examples.

Example 1

| | |
|---|---|
| Feed: | H2 97%, N2 3% |
| Adsorption pressure PH: | 30 bars abs. |
| Regeneration pressure PB: | 1.1 bar abs. |
| Cycle with pressure balancing | |
| Adsorbent: | zeolite 5A |

(1.1) With a recycling of residual gas corresponding to 14% of the flow rate of the hydrogen product, the production for an optimized cycle would be increased by 7%.

In practice, the cycle to be accelerated by the order of 15% to maintain the purity of the hydrogen, the decrease of output of the PSA unit due to less favorable kinetics is of the order of 1%.

Similarly, as to the available feed flow rate, the net gain for the production of hydrogen, relative to the absence of recycling, is hence 7%–1%=6%.

(1.2) With recycling of residual gas corresponding to 25% of the flow rate of hydrogen product, the production for an optimum cycle would be an increase of 11%.

In practice, if the cycle is accelerated by the order of 30%, the gain in production of $H_2$ would be about 9%.

Example 2

| | |
|---|---|
| Feed: | H2 80%, N2 20% |
| Adsorption pressure PH: | 30 bars abs. |
| Regeneration pressure PB: | 1.1 bar abs. |
| Cycle with pressure balancing | |
| Adsorbent: | zeolite 5A |

For a recycle representing 12% of the production flow rate, namely about 7% of the available feed flow rate, the production of hydrogen is increased by the order of 2.5% while maintaining its purity, relative to the absence of recycling.

In the two cases, it will be seen that more hydrogen is produced because of recycling, in spite of a drop in intrinsic output of the PSA unit itself.

As will be understood from the fact that the recycled flow rate is adapted to the production of hydrogen, the extra compression energy spent is only that just necessary for the excess of the gas product. Moreover, thanks to the concomitant variation of the duration of the cycle T, the volume of adsorbent necessary remains that which corresponds to the nominal production.

In the installation of FIG. 1, the feed is available at low pressure, which is to say substantially at the same pressure, slightly greater than atmospheric pressure, as the residual gas from the adsorbers. The recycle conduit 8 is accordingly directly connected to the intake of the compressor 6.

Figure 3:
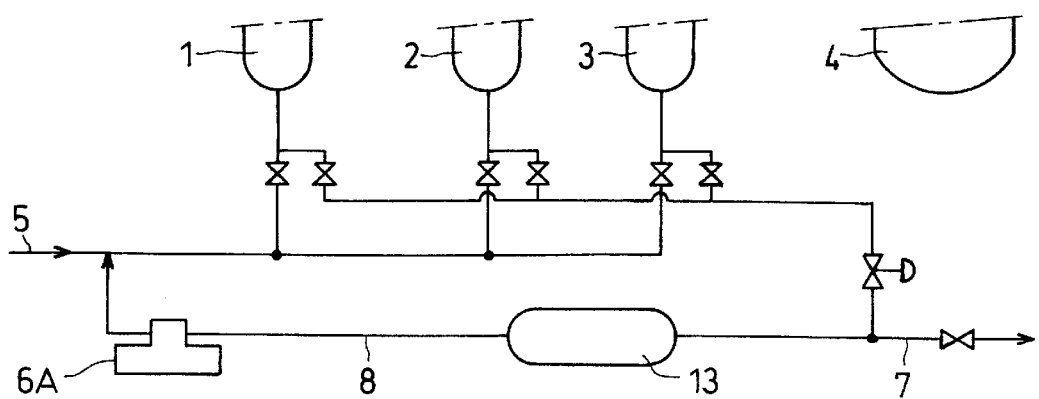
FIG. 3 is a fragmentary schematic view of a modification of the installation.

As a modification (FIG. 3), if the feed is available at the high pressure PH, the residual recycled gas, from the storage 13, is compressed to the same pressure PH by a compressor 6A. In this modification, as shown, the flow rate adjustment member 14 of FIG. 1 can be omitted.

The adjustment of the recycle flow rate can be continuous or stepwise, for example 0, 25%, 50%, 75% and 100% of the maximum recycled flow rate.

The cycle described above is but one example of the PSA cycles to which the invention can be applied.

Thus, among the possible variations, can be cited the number of adsorbers; the absence of the auxiliary storage 4 (in which case the gas from an adsorber goes directly to another adsorber in the course of elution, which can be the case with a PSA unit with four adsorbers); the repressurization can last over all one phase, by superposing it, at the beginning of repressurization, on the pressure balancing, or it can take place partially co-current with the gas to be treated; or again the arrangements of the valves.

What is claimed is:

1. Process for the purification of a gas containing preferentially adsorbable impurities by pressure swing adsorption (PSA) using several adsorbers with, for each adsorber, a cycle comprising the following operative phases, which are offset from one adsorber to another by one $\underline{n}$th of the duration (T) of the cycle, in which $\underline{n}$ designates the number of adsorbers:

substantially isobaric adsorption at a high pressure of the cycle, this adsorption phase comprising the admission of impure gas to be treated into the adsorber through a first end of the adsorber, with circulation of said impure gas in the adsorber and simultaneous withdrawal through the other end of the adsorber of purified gas of which at least a portion constitutes the gaseous product, the direction of circulation in the adsorber in the course of this production phase being called co-current and the reverse direction of circulation being called counter-current; regeneration of the adsorber ending with at least one final step in which a residual gas is withdrawn counter-current from the adsorber; and the pressure increased to a high pressure (PH) of the cycle, wherein during a recycling step a variable portion of said residual gas is recycled, not exceeding 30% of the flow rate of the purified gaseous product, into the impure gas to be treated, the rest of this residual gas constituting a purge; and the duration (T) of the cycle is shortened when said recycling is carried out, the more as the recycled flow rate is greater.

2. The process according to claim 1, wherein the flow rate of the recycled residual gas is temporarily zero and temporarily comprised between 10 and 30% of the flow rate of the purified gaseous product.

3. The process according to claim 1, wherein the residual gas is recycled when and only when the flow rate of the gaseous product is greater than a predetermined value.

4. The process according to claim 1, wherein the flow rate of the impure gaseous feed is maintained constant, and the flow rate of the recycled residual gas is varied as a function of the flow rate of the purified gaseous product, the variations of these two flow rates taking place in the same direction.

5. The process according to claim 1, wherein the decrease of the duration (T) of the cycle is comprised between about 1 and 30% of the duration of the cycle without recycling.

6. The process according to claim 1, wherein said regeneration begins with a single step of co-current depressurization by pressure balancing with another adsorber in the pressure increase phase.

7. The process according to claim 6, wherein said single step of co-current depressurization by pressure balancing is followed by a second co-current depressurization step, the gas from the adsorber during this step being used as elution gas.

8. The process according to claim 7, wherein there is used an adsorption unit with three adsorbers, and in that the gas from the adsorber in the course of the second co-current depressurization step is sent to an auxiliary elution storage.

9. The process according to claim 7, wherein there is used an adsorption unit with four adsorbers, and in that the gas from the adsorber in the course of the second co-current depressurization step is directly sent to another adsorber to carry out its countercurrent elution.

10. The process according to claim 1, wherein the regeneration comprises two final steps, namely
   (a) a countercurrent depressurization to a low pressure (PB) of the cycle; and
   (b) a countercurrent elution.

* * * * *